United States Patent
Wu et al.

(10) Patent No.: US 12,415,273 B2
(45) Date of Patent: Sep. 16, 2025

(54) CONTROL OF ROBOTIC ARMS THROUGH HYBRID INVERSE KINEMATICS AND INTUITIVE REFERENCE FRAME

(71) Applicant: University of South Florida, Tampa, FL (US)

(72) Inventors: Lei Wu, Tampa, FL (US); Redwan Alqasemi, Wesley Chapel, FL (US); Rajiv Dubey, Tampa, FL (US)

(73) Assignee: University of South Florida, Tampa, FL (US)

( * ) Notice: Subject to any disclaimer, the term of this patent is extended or adjusted under 35 U.S.C. 154(b) by 622 days.

(21) Appl. No.: 17/689,534

(22) Filed: Mar. 8, 2022

(65) Prior Publication Data

US 2022/0288780 A1    Sep. 15, 2022

Related U.S. Application Data

(60) Provisional application No. 63/160,282, filed on Mar. 12, 2021.

(51) Int. Cl.
*B25J 9/16*    (2006.01)
*B25J 3/00*    (2006.01)
(Continued)

(52) U.S. Cl.
CPC .............. *B25J 9/1664* (2013.01); *B25J 3/00* (2013.01); *B25J 9/023* (2013.01); *B25J 9/06* (2013.01); *B25J 9/1607* (2013.01); *B25J 9/1689* (2013.01)

(58) Field of Classification Search
CPC ....... B25J 3/00; B25J 9/023; B25J 9/06; B25J 9/1607; B25J 9/1664; B25J 9/1689; G05B 2219/40182
See application file for complete search history.

(56) References Cited

U.S. PATENT DOCUMENTS

| 7,904,202 B2 | 3/2011 | Hoppe |
| 8,483,882 B2 | 7/2013 | Abdallah et al. |

(Continued)

OTHER PUBLICATIONS

Allard et al., "Transfer learning for semg hand gestures recognition using convolutional neural networks," 2017 IEEE International Conference on Systems, Man, and Cybernetics (SMC), 2017, pp. 1663-1668.

(Continued)

*Primary Examiner* — Tameem D Siddiquee
(74) *Attorney, Agent, or Firm* — Andrew Behrens; Smith & Hopen, P.A.

(57) ABSTRACT

Disclosed is an intuitive robotic device control reference frame with hybrid inverse kinematics having a natural and easier human-robot interface. A system for controlling a robot can include a robotic device that performs tasks, an input device that receives user input indicating desired movement of the robotic device to perform the tasks, and a controller that controls the robotic device based on the user input. The controller can receive signals identifying the user input, determine a ground reference frame and an end-effector reference frame for controlling movement of the robotic device, generate, based on the ground reference frame and the end-effector reference frame, an intuitive reference frame for controlling movement of the robotic device, determine controls to move the robotic device in the intuitive reference frame, generate instructions for controlling movement of the robotic device, and execute the instructions to control movement of the robotic device.

20 Claims, 11 Drawing Sheets

(51) Int. Cl.
  B25J 9/02 (2006.01)
  B25J 9/06 (2006.01)

(56) References Cited

U.S. PATENT DOCUMENTS

| | | | |
|---|---|---|---|
| 10,617,480 B2 | 4/2020 | Brisson | |
| 2013/0325032 A1* | 12/2013 | Schena | A61B 34/37 606/130 |
| 2017/0333142 A1* | 11/2017 | Itkowitz | A61G 13/02 |
| 2019/0099183 A1 | 4/2019 | Leimbach et al. | |
| 2020/0060777 A1 | 2/2020 | Nowlin et al. | |
| 2020/0360097 A1* | 11/2020 | DiMaio | G16H 80/00 |
| 2021/0394217 A1* | 12/2021 | Chevron | B05B 12/00 |
| 2022/0226987 A1* | 7/2022 | Bacher | B62D 57/032 |
| 2023/0363830 A1* | 11/2023 | Polchin | A61B 5/7425 |

OTHER PUBLICATIONS

Alqasemi, "Maximizing manipulation capabilities of persons with disabilities using a smart 9-degree-of-freedom wheelchair mounted robotic arm system," University of South Florida Graduate Theses and Dissertation, Mar. 2007, pp. 1-444.

Baldi et al., "Design of a wearable interface for lightweight robotic arm for people with mobility impairments," 2017 International Conference on Rehabilitation Robotics (ICORR), 2017, pp. 1567-1573.

Campeau-Lecours et al., "Intuitive adaptive orientation control for enhanced human-robot interaction," IEEE Transactions on Robotics, 2019, vol. 35:509-520.

Chiu et al., "A wireless steady state visually evoked potential-based bci eating assistive system," 2017 International Joint Conference on Neural Networks (IJCNN), 2017, 3003-3007.

Chung et al., "Performance evaluation of a mobile touchscreen interface for assistive robotic manipulators: A pilot study," Topics in spinal cord injury rehabilitation, 2017, 23 2:131-139.

Du et al., "A markerless human-robot interface using particle filter and kalman filter for dual robots," IEEE Transactions on Industrial Electronics, 2015, 62(4):2257-2264.

Fall et al., "Wireless semgbased body-machine interface for assistive technology devices," IEEE Journal of Biomedical and Health Informatics, 2017, 21:967-977.

Featherstone, "Position and velocity transformations between robot end-effector coordinates and joint angles," The International Journal of Robotics Research, 1983, 2(2):35-4535-45, 1983.

Herlant et al., "Assistive teleoperation of robot arms via automatic time-optimal mode switching," The Eleventh ACM/IEEE International Conference on Human Robot Interaction, 2016, 35-42.

Introduction to Robotics: Mechanics and Control, Addison-Wesley series in electrical and computer engineering: control engineering, Pearson/Prentice Hall, 1986.

Jain et al., "Assistive robotic manipulation through shared autonomy and a body-machine interface," 2015 IEEE International Conference on Rehabilitation Robotics (ICORR), 2015, pp. 526-531.

Lin et al., "The implementation of augmented reality in a robotic teleoperation system," 2016 IEEE International Conference on Real-time Computing and Robotics (RCAR), 2016, pp. 134-139.

Mandlekar et al., "Roboturk: A crowdsourcing platform for robotic skill learning through imitation," 2nd Conference on Robot Learning (CoRL 2018), Nov. 2018, pp. 1-15.

McMullen et al., "Demonstration of a semi-autonomous hybrid brain-machine interface using human intracranial eeg, eye tracking, and computer vision to control a robotic upper limb prosthetic," IEEE Transactions on Neural Systems and Rehabilitation Engineering, 2014, 22:784-796.

Meattini et al., "An semg-based human-robot interface for robotic hands using machine learning and synergies," IEEE Transactions on Components, Packaging and Manufacturing Technology, 2018, 8(7):1149-1158.

Mohammed et al., "Brainwaves driven human-robot collaborative assembly," CIRP annals, 2018, 67(1):13-16.

Muelling et al., "Autonomy infused teleoperation with application to brain computer interface controlled manipulation," Autonomous Robots, 2017, 41:1401-1422.

Vu et al., "A new 6-dof haptic device for teleoperation of 6-dof serial robots," IEEE Transactions on Instrumentation and Measurement, 2011, 60:3510-3523.

Wilson et al., "Relative end-effector control using cartesian position based visual servoing," IEEE Transactions on Robotics and Automation, 1996, 12(5):684-696.

Wu et al., "Development of smartphone based human-robot interfaces for individuals with disabilities," IEEE Robotics and Automation Letters, 2020, 5(4):5835-5841.

Yang et al., "Interfacedesign of a physical human-robot interaction system for humanimpedance adaptive skill transfer," IEEE Transactions on Automation Science and Engineering, 2017, 15(1):329-340.

* cited by examiner

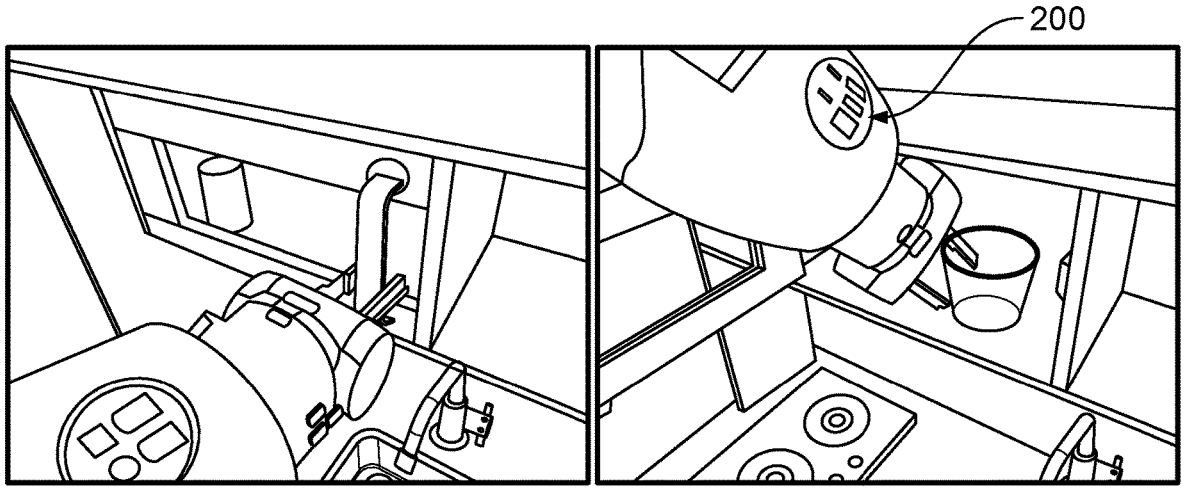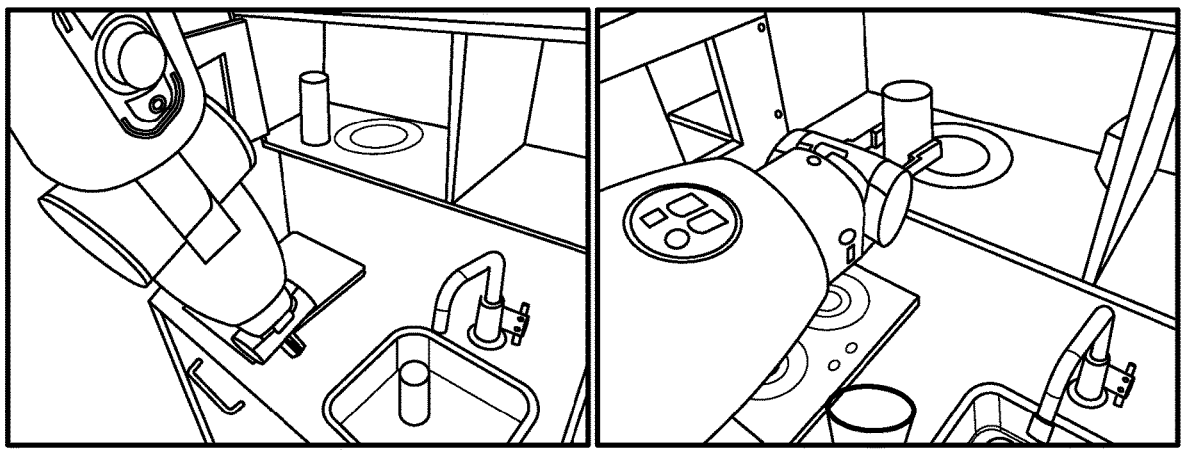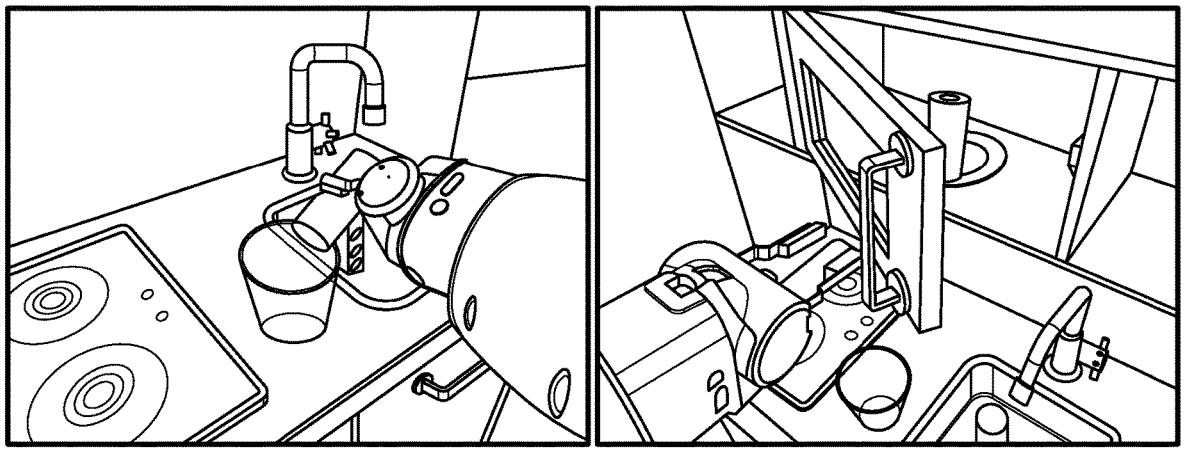

_US 12,415,273 B2_

CONTROL OF ROBOTIC ARMS THROUGH HYBRID INVERSE KINEMATICS AND INTUITIVE REFERENCE FRAME

CROSS-REFERENCE TO RELATED APPLICATION

This application claims priority to U.S. Provisional Application No. 63/160,282, filed on Mar. 12, 2021, the contents of which are incorporated herein by reference in its entirety.

STATEMENT REGARDING FEDERAL SPONSORSHIP

This invention was made with government support under grant 1826258 awarded by the National Science Foundation. The government has certain rights in the invention.

TECHNICAL FIELD

This document generally describes devices, systems, and methods related to intuitively controlling robotic devices, such as robotic arms.

BACKGROUND

Increasingly, robots can be used to perform tasks for humans. Some robots can be controlled by human operators to perform such tasks, while other robots may automatically or autonomously perform such tasks. As robotic devices become more integrated with our daily lives, human-robot interaction can be increasingly relevant to operating and using these devices in an efficient and intuitive manner.

Different reference frames can be used by the human operators of robots. Some reference frames can have frames of motion that may not replicate a human operator's perspective of motion. For example, robot teleoperation can be based on Ground and End-effector control reference frames. These reference frames can confuse the operator since their prospective of motion is different from the motion that is based on the Ground and End-effector reference frames. The Ground and End-effector control reference frames may not map onto or relate to the human operator's Cartesian directional perspectives.

SUMMARY

The document generally describes technology for an intuitive robotic arm control reference frame with, for example, hybrid inverse kinematics solution (e.g., hybrid system). The disclosed technology can provide for more efficient and more intuitive control by users, for example, who teleoperate robotic arms and/or other robotic devices. As a result, the users can better predict movement of a robotic device when manipulating it using a variety of different input devices. Hybrid inverse kinematics can provide the user with capability of controlling the robotic device from multiple different reference frames at a same time, which can provide the user with more flexibility and improve overall user experience when controlling the robotic device.

The disclosed technology can incorporate a human operator's (e.g., user) perceived sense of direction into the systems, methods, and techniques described herein in such that each direction of robotic motion (e.g., Cartesian motion) can correspond to the same direction from the human operator's prospective. This technology can be used in any of a variety of applications, such as industrial uses, commercial uses, research, and/or robotic arms (e.g., personal robotic arms, commercial robotic arms). This technology can also be used, for example, for heavy machinery in construction and space applications.

As described herein, mapping of user input to robot control output can provide for motion commands that are provide from and based on the user's perspective and/or vantage point. After mapping, hybrid inverse kinematics can be used to control the robotic device, such as through the use of multiple Jacobians to identify joint rates based on Cartesian commanded velocities.

Particular embodiments described herein include a system for controlling a robotic device, the system including a robotic device configured to perform one or more tasks, an input device configured to receive user input indicating desired movement of the robotic device to perform the one or more tasks, and a controller configured to control the robotic device based on the user input indicating the desired movement of the robotic device. The controller can receive signals identifying the user input from the input device, determine a ground reference frame for controlling movement of the robotic device, determine an end-effector reference frame for controlling movement of the robotic device, generate, based on the ground reference frame and the end-effector reference frame, an intuitive reference frame for controlling movement of the robotic device, determine controls to move the robotic device in the intuitive reference frame, generate instructions for controlling movement of the robotic device, and execute the instructions to control movement of the robotic device. The robotic device can perform the one or more tasks in response to the controller executing the instructions. Moreover, the ground reference frame can be based on a base location of the robotic device relative to a ground surface. The end-effector reference frame can be based on a current joint configuration of the robotic device.

In some implementations, the system can optionally include one or more of the following features. For example, the controller can also receive user input indicating movement along an x axis of the end-effector reference frame, and determine, based on the user input, corresponding controls to move the robotic device in a forward or a backward direction in the intuitive reference frame. The controller can receive user input indicating movement along an axis perpendicular to an x axis of the end-effector reference frame and parallel to a ground surface, and determine, based on the user input, corresponding controls to move the robotic device in a left or a right direction in the intuitive reference frame. The controller can also receive user input indicating movement along a z axis of the ground reference frame, and determine, based on the user input, corresponding controls to move the robotic device in an up or a down direction in the intuitive reference frame. The controller can receive user input indicating movement around an x axis of the end-effector reference frame, and determine, based on the user input, corresponding controls to move the robotic device in a roll direction in the intuitive reference frame. Moreover, the controller can receive user input indicating movement around an axis perpendicular to an x axis of the end-effector reference frame and parallel to a ground surface, and determine, based on the user input, corresponding controls to move the robotic device in a pitch direction in the intuitive reference frame. The controller can also receive user input indicating movement around a z axis of the ground reference frame, and determine, based on the user input, corresponding controls to move the robotic device in a yaw direction in the intuitive reference frame.

As another example, the robotic device can be controlled in the end-effector reference frame or the ground reference frame. Determining the end-effector reference frame can include transforming the ground reference frame based on the current joint configuration of the robotic device. The end-effector reference frame can change with the current joint configuration of the robotic device.

As another example, generating the intuitive reference frame can include assigning an x axis of the intuitive reference frame to an x axis of the end-effector reference frame. Generating the intuitive reference frame can include assigning a y axis of the intuitive reference frame based on a cross product of a z axis of the ground reference frame and the x axis of the intuitive reference frame. Generating the intuitive reference frame can also include assigning a z axis of the intuitive reference frame based on a cross product of the x axis of the intuitive reference frame and the y axis of the intuitive reference frame.

Particular embodiments described herein can also include a method for controlling movement of a robotic device. The method can include receiving, by a controller and from an input device, user input indicating desired movement of a robotic device, determining, by the controller, a ground reference frame for controlling movement of the robotic device, determining, by the controller, an end-effector reference frame for controlling movement of the robotic device, generating, by the controller and based on the ground reference frame and the end-effector reference frame, an intuitive reference frame for controlling movement of the robotic device, determining, by the controller, controls to move the robotic device in the intuitive reference frame, and generating, by the controller, instructions for controlling movement of the robotic device. The ground reference frame can be based on a base location of the robotic device relative to a ground surface. The end-effector reference frame can be based on a current joint configuration of the robotic device.

In some implementations, the method can optionally include one or more of the following features. For example, the method can further include executing, by the controller, the instructions to control movement of the robotic device. As another example, the method can include receiving, by the controller and from the input device, user input indicating movement along an x axis of the end-effector reference frame, and determining, by the controller and based on the user input, corresponding controls to move the robotic device in a forward or a backward direction in the intuitive reference frame. The method can also include receiving, by the controller and from the input device, user input indicating movement along an axis perpendicular to an x axis of the end-effector reference frame and parallel to a ground surface, and determining, by the controller and based on the user input, corresponding controls to move the robotic device in a left or a right direction in the intuitive reference frame.

Moreover, the method can include receiving, by the controller and from the input device, user input indicating movement along a z axis of the ground reference frame, and determining, by the controller and based on the user input, corresponding controls to move the robotic device in an up or a down direction in the intuitive reference frame. The method can also include receiving, by the controller and from the input device, user input indicating movement around an x axis of the end-effector reference frame, and determining, by the controller and based on the user input, corresponding controls to move the robotic device in a roll direction in the intuitive reference frame. Further, the method can include receiving, by the controller and from the input device, user input indicating movement around an axis perpendicular to an x axis of the end-effector reference frame and parallel to a ground surface, and determining, by the controller and based on the user input, corresponding controls to move the robotic device in a pitch direction in the intuitive reference frame.

The devices, system, and techniques described herein may provide one or more of the following advantages. For example, the disclosed technology can provide for more intuitive control of robotic devices. The disclosed technology provides for a reference frame for robotic motions that can match the human operator's perceived directions. In other words, the disclosed technology deals with user perception of directions and provides robotic motions that are relevant to the user's perceived directions. The robotic motions can match perceived directions at all times, regardless of a gripper orientation. Therefore, the human operator can have continuous intuitive control of the robotic device as if the human operator is performing tasks themselves rather than through the robotic device. The disclosed technology can also provide for a better interface of teleoperation from the user's perspective.

Moreover, the disclosed technology can provide user control of the robotic device from different reference frames at the same time. The user may not have to change how they control the robotic device using various input devices. Instead, the user can continue to operate the robotic device using their perceived directions of operation/movement. As a result, the user can have more flexibility to control the robotic device to perform a variety of different tasks. The user can also have an improved experience in controlling the robotic device since the user may not become confused with transforming their perceived motions into actual motions of the robotic device.

As another example, the disclosed technology provides for ease of application to many different industries and robotic hardware. The disclosed technology may not be hardware-specific. Rather, it can be used in research, personal, and work environments, thereby providing intuitive and easy control of robotic devices in any field of work or use.

The details of one or more implementations are set forth in the accompanying drawings and the description below. Other features and advantages will be apparent from the description and drawings, and from the claims.

BRIEF DESCRIPTION OF THE DRAWINGS

FIGS. 5A-F illustrate example activity of daily living (ADL) tasks performed with the disclosed intuitive reference frame.

Like reference symbols in the various drawings indicate like elements.

DETAILED DESCRIPTION OF ILLUSTRATIVE EMBODIMENTS

Figure 1:
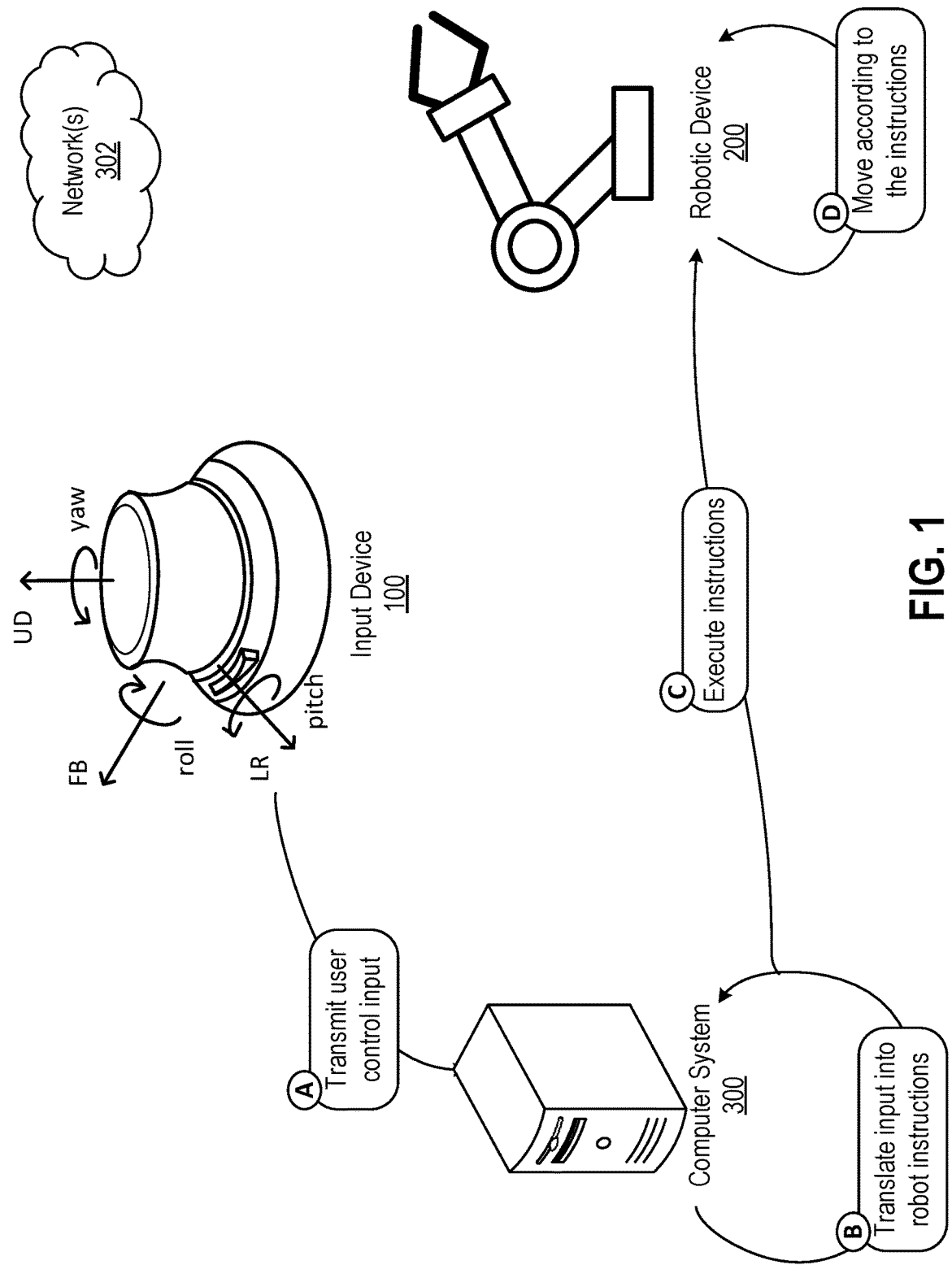
FIG. 1 is a conceptual diagram for using an intuitive reference frame to control movement of a robotic device.

This document generally describes intuitive robotic controls (e.g., robotic arm controls) using reference frames with hybrid inverse kinematics solutions (e.g., hybrid system). Building an easy-to-use human-robot interface system for users can include precise and responsive robotic arm hardware, an intuitive user input device, and a control algorithm that runs behind the scenes. The disclosed technology can be a foundation for producing a more natural and easier to use human-robot interface. Two conventional control reference frames (the Ground and the End-effector) can be compared with the disclosed technology's intuitive control reference frame, as described herein. An activity of daily living (ADL) task can be used to test performance of the three control reference frames. In the examples described herein, a 6-D spacemouse can be used as an input device for the human-robot interface to control an example Baxter robotic arm. The 6-D spacemouse can be used to perform the same ADL task using the three different control reference frames described herein. One or more different input devices can be used for the human-robot interface to control one or more different robotic devices. As described herein, the disclosed technology is advantageous because it is not hardware specific and can be applied to a variety of different applications, input devices, and robotic devices.

The examples described herein test the three control reference frame systems with human subjects. Results indicate that the disclosed technology's intuitive robotic arm control reference frame with the hybrid inverse kinematics can greatly reduce efforts needed by the human operator (e.g., user) to manipulate the robotic arm. This is because the disclosed technology provides a more intuitive way to maneuver the robotic arm compared to the controls using the conventional reference frames.

Some existing robotic arm control algorithms can use an End-effector reference frame or a Ground reference frame when maneuvering roll rotation and forward/backward translation of the robotic arm. Some robotic control has been improved by implementing new user input devices that can improve accuracy, environment adaptiveness, and intuitiveness of the human-robot interfaces. Examples of such devices include joysticks, touchscreens, brain-computer interfaces, EMGs, etc.

The disclosed technology provides for improving robotic controls in relation to the reference frame on which End-effector Cartesian motion can be based. The existing End-effector and Ground reference frames may not always provide for intuitive control from the perspective of the human user. For example, when using the Ground reference frame or the End-effector reference frame to control a robotic arm, no matter what input device is used, users tend to find it difficult to maneuver the robotic arm to complete complex tasks that may require translational motion and rotational motion throughout the process. Due to such poor intuitiveness of the two reference frames, human operators need to put in significant effort to think from the robot's perspective in order to properly control the robot.

When preliminary testing was conducted with human subjects to use Ground and End-effector reference frames separately to maneuver objects in 3D space, results indicated that when operating a robotic arm, most of the human subjects preferred to maneuver the forward/backward translation and roll rotation in the End-effector reference frame, but maneuver up/down translation and yaw rotation in the Ground reference frame. However, the human subjects also wanted to maneuver left/right translational motion along an axis perpendicular to the end-effector and parallel to the ground surface, which is neither described in the Ground reference frame nor in the End-effector reference frame. The human subjects also wanted to maneuver pitch rotational motion around this axis. The disclosed technology, on the other hand, can provide for more intuitive control of the robotic arm using an intuitive reference frame and hybrid inverse kinematics. As a result, users can maneuver the robotic arm more intuitively in directions that are not offered by the Ground or End-effector reference frames.

Referring to the figures, FIG. 1 is a conceptual diagram for using an intuitive reference frame to control movement of a robotic device 200. A user input device 100 can communicate (e.g., wired and/or wirelessly) with a computer system 300 over network(s) 302 to control movement of the robotic device 200 (e.g., refer to FIG. 9). The input device 100 can be a joystick, camera, or other IMU module or input device that can be used for intuitively controlling the robotic device 200 based on user input received at the input device 100.

For example, the computer system 300 can receive user control input from the input device 100 in step A. The user control input can indicate desired movement of the robotic device 200 to perform one or more tasks. The computer system 300 can translate the user input into instructions to move the robot as the user desired in step B. The computer system 300 can continuously receive user input from the input device and continuously translate the user input into movement commands for the robotic device 200. The computer system 300 can execute the instructions in step C. By executing the instructions, the robotic device 200 can move according to the instructions in step D.

The input device 100 can provide a 6 degrees of freedom (DoF) Cartesian space user input velocity vector for controlling robotic arms, such as the robotic device 200 or other robotic devices, as shown in equation 1:

$$v_u = \begin{bmatrix} FB \\ LR \\ UD \\ roll \\ pitch \\ yaw \end{bmatrix} \quad (1)$$

Moreover, FIG. 1 shows an example of how the 6 DoF user input vector is related to hardware of the input device 100. $V_u$ can be a user input Cartesian velocity command consisting of three translational motion speeds and three rotational motion speeds. F˙B can refer to forward and backward speed, L˙R can refer to left and right speed, U˙D can refer to up and down speed, and roll, pitch, yaw can refer to the Cartesian angular velocities commands. Vector $v_u$ can have a different control perspective based on the used reference frame. Pre-superscripts G, E, or I can be added to the vector $v_u$, as shown below, to refer to Ground, End-effector, and Intuitive reference frames, respectively. In FIG. 1, the user input device 100 is a spacemouse having 6 DoF controls including forward or backward (FB), up or down (UD), left or right (LR), and roll, pitch, and yaw for rotation.

Figure 2:
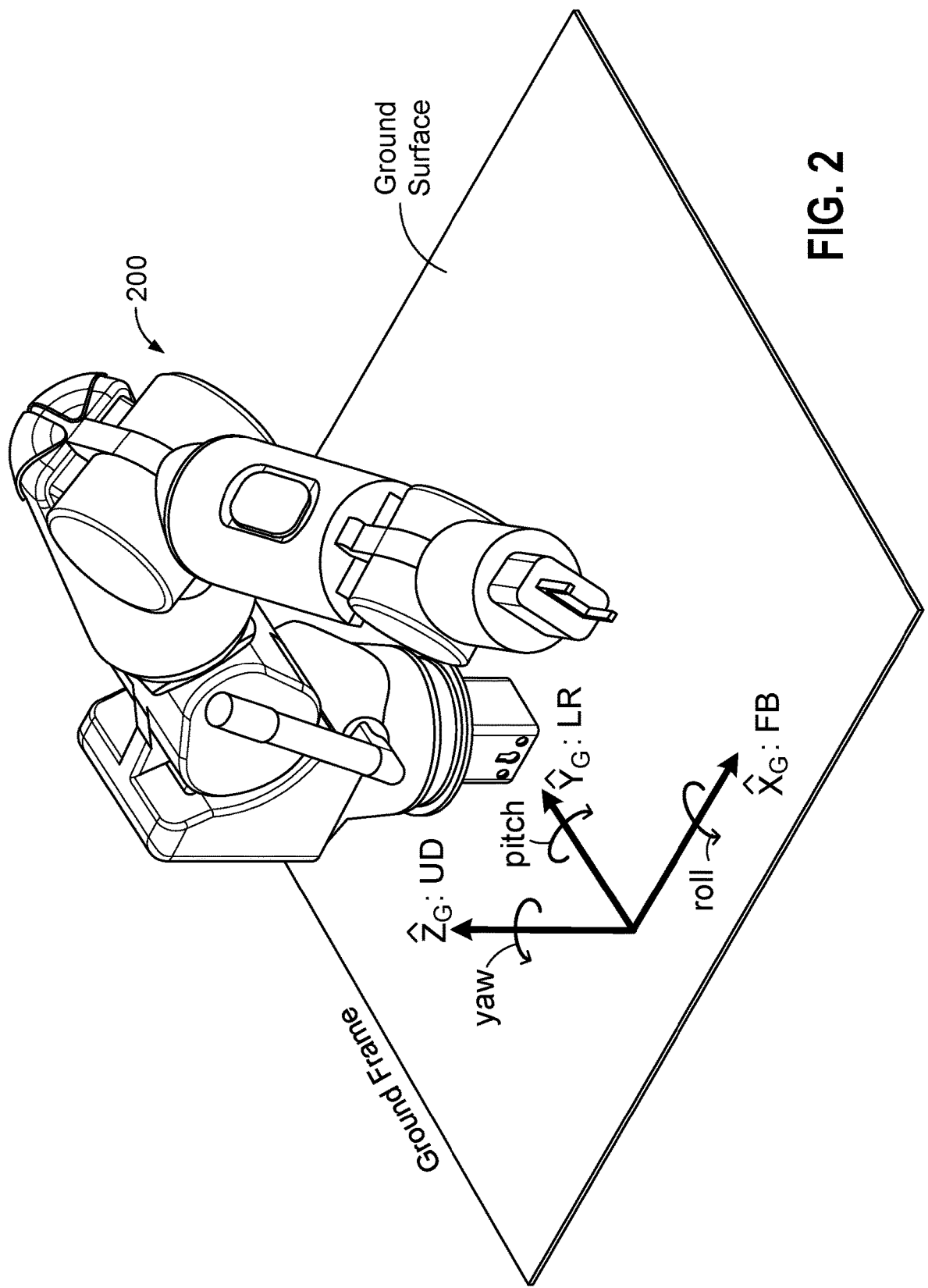
FIG. 2 is an example embodiment of a Ground reference frame with mapped degrees of freedom (DoF) user control vectors.

FIG. 2 is an example embodiment of a Ground reference frame with mapped degrees of freedom (DoF) user control vectors. To control robotic arm 200 in reference to the Ground frame, the following equation 2 can be used:

$$\dot{q} = \begin{bmatrix} \dot{\theta}_1 \\ \dot{\theta}_2 \\ \vdots \\ \dot{\theta}_n \end{bmatrix} = [J_G]^+ \cdot {}^G\begin{bmatrix} \dot{FB} \\ \dot{LR} \\ \dot{UD} \\ \dot{roll} \\ \dot{pitch} \\ \dot{yaw} \end{bmatrix} \quad (2)$$

Where $J_G$ can be the Jacobian matrix of the robotic arm 200 with respect to the Ground reference frame, $J_G$ can be calculated from the forward kinematics. $[\ ]^+$ can be the operation of pseudo-inverse. $\dot{q}$ can be the joint velocity of the robotic arm 200, which can be sent to the robot controller directly in real-time.

FIG. 2 shows how the user input vector can be mapped to the Ground reference frame. As depicted, regardless of how the Cartesian position and orientation of the end-effector is, the control of the end-effector may always be with respect to the Ground reference frame.

Figure 3:
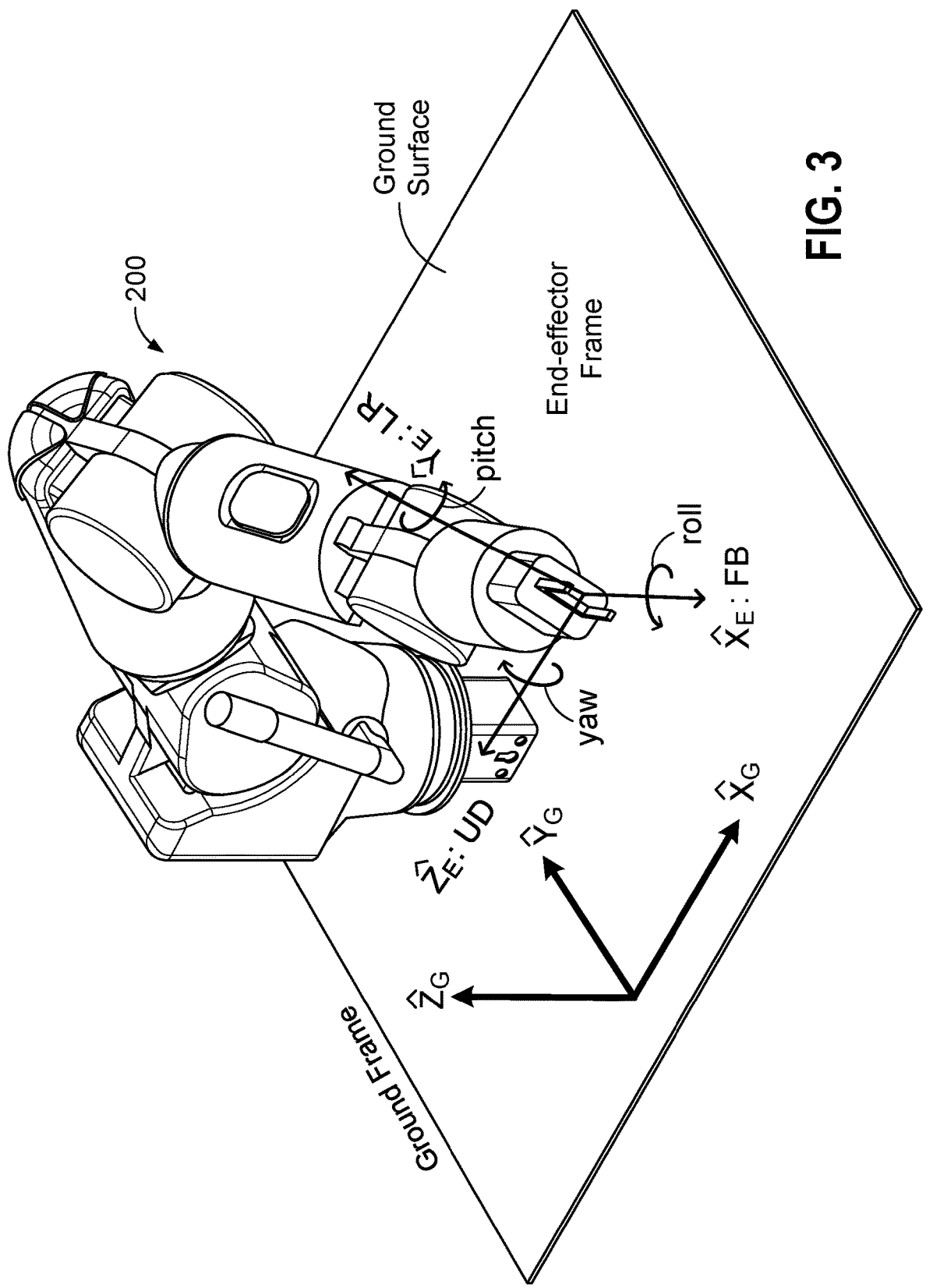
FIG. 3 is an example embodiment of an End-effector reference frame with mapped DoF user control vectors.

FIG. 3 is an example embodiment of an End-effector reference frame with mapped DoF user control vectors. In order to find the Jacobian matrix with respect to the End-effector reference frame, a frame transformation can be performed as shown in equation 3:

$$J_E = \begin{bmatrix} {}^G_E R & 0 \\ 0 & {}^G_E R \end{bmatrix}^T \cdot J_G \quad (3)$$

Where ${}_{GE}R$ can be the rotation matrix that describes the End-effector reference frame relative to the Ground reference frame, which can be calculated from the forward kinematics. $J_E$ can be the Jacobian matrix with respect to the End-effector reference frame.

To control the robotic arm 200 in reference to the End-effector frame, the following equation 4 can be used:

$$\dot{q} = \begin{bmatrix} \dot{\theta}_1 \\ \dot{\theta}_2 \\ \vdots \\ \dot{\theta}_n \end{bmatrix} = [J_E]^+ \cdot {}^E\begin{bmatrix} \dot{FB} \\ \dot{LR} \\ \dot{UD} \\ \dot{roll} \\ \dot{pitch} \\ \dot{yaw} \end{bmatrix} \quad (4)$$

FIG. 3 demonstrates how the user input vector can be mapped when using the End-effector reference frame. Different from the Ground reference frame, the End-effector reference frame can change with the current pose of the end-effector.

Figure 4:
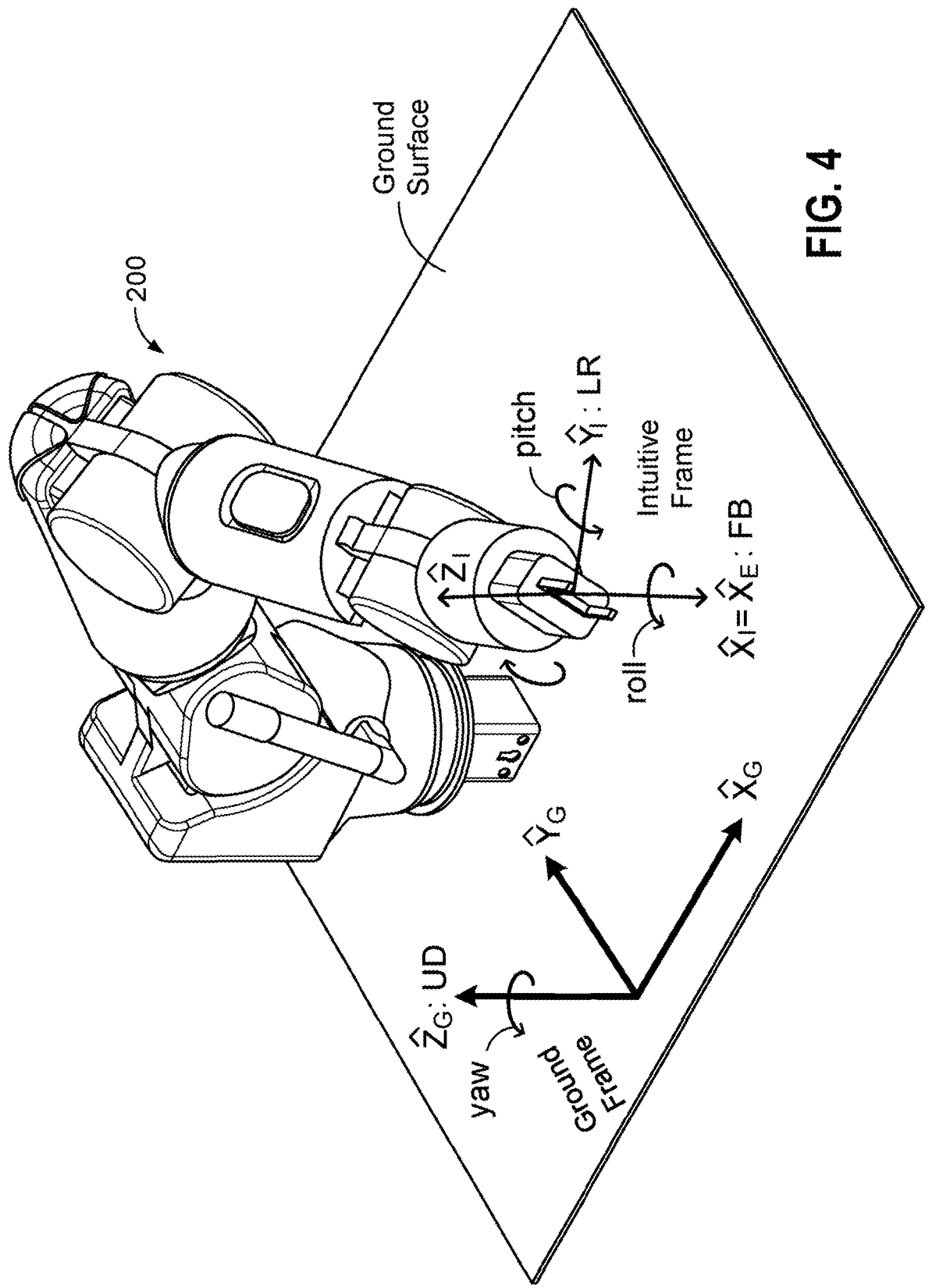
FIG. 4 is an example embodiment of the disclosed intuitive reference frame with mapped DoF user control vectors.

FIG. 4 is an example embodiment of the disclosed intuitive reference frame with mapped DoF user control vectors. Preliminary testing can be performed with 12 human subjects to determine a control preference when teleoperating the robotic arm 200 to perform ADL tasks. User preference parameters can be collected and analyzed to develop requirements for the disclosed Intuitive reference frame. Table I demonstrates a summary of requirements that can be adopted for the Intuitive reference frame.

TABLE 1

Technical requirements of building an intuitive robotic arm teleoperation system summarized from user feedback.

| # | Direction | User preference |
|---|-----------|-----------------|
| 1 | Forward/Backward | Along the X-axis of the End-effector Reference Frame, which is the $\hat{X}_E$ axis. |
| 2 | Left/Right | Along an axis which is perpendicular to the end-effector axis $\hat{X}_E$ and parallel to the ground surface. |
| 3 | Up/Down | Along the Z-axis of the Ground Reference Frame, which is the $\hat{Z}_G$ axis. |
| 4 | roll | Around the $\hat{X}_E$ axis of the End-effector Reference Frame. |
| 5 | pitch | Around an axis which is perpendicular to the end-effector axis $\hat{X}_E$ and parallel to the ground surface. |
| 6 | yaw | Around the $\hat{Z}_G$ axis of the Ground Reference Frame. |

According to requirements #1 and #4, the X axis of the Intuitive reference frame can be assigned the same as the X axis of the End-effector reference frame.

$${}^I\hat{X}_I = {}^E\hat{X}_E = \begin{bmatrix} 1 \\ 0 \\ 0 \end{bmatrix} \quad (5)$$

Where ${}^I\hat{X}_I$ can be the unit vector of X axis of the Intuitive reference frame described in its own frame, and ${}^E\hat{X}_E$ can be the unit vector of X axis of the End-effector reference frame described in its own frame.

To describe the vector $\hat{X}_I$ relative to the Ground reference frame, a rotation operation can be used, such as in equation 6:

$${}^G\hat{X}_I = {}^G_E R \cdot {}^I\hat{X}_I = {}^G_E R \cdot \begin{bmatrix} 1 \\ 0 \\ 0 \end{bmatrix} \quad (6)$$

Where ${}^G\hat{X}_I$ can be the unit vector $\hat{X}_I$ described in the Ground reference frame. This can fulfill the requirements #1 and #4, allowing the user to control forward/backward based on the End-effort's X axis.

To fulfill the requirements #2 and #5, a unit vector can be constructed that can be perpendicular to the end-effector and parallel to the ground surface, by finding a cross product between the Z axis of the Ground frame and the X axis of the Intuitive frame, as shown in equation 7:

$${}^G Y_I = {}^G\hat{Z}_G \times {}^G\hat{X}_I = \begin{bmatrix} 0 \\ 0 \\ 1 \end{bmatrix} \times {}^G\hat{X}_I \quad (7)$$

Where ${}^G Y_I$ can be a vector that is perpendicular to the end-effector and parallel to the ground surface, described in the Ground reference frame. When the end-effector is perpendicular to the ground surface, $^G\hat{X}_I$ can be equal to $^G\hat{Z}_G$, which can result in algorithmic singularity. When the angle between $^G\hat{X}_I$ and $^G\hat{Z}_G$ is less than 10 degrees, the Intuitive frame can be switched to the Ground frame in order to avoid algorithmic singularity.

To normalize $^G Y_I$, equation 8 can be used:

$$^G\hat{Y}_I = \frac{^G Y_I}{|^G Y_I|} \tag{8}$$

Where $^G\hat{Y}_I$ can be a unit vector of $^G Y_I$.

The Z axis of the Intuitive reference frame can be calculated using a cross product of unit vectors X and Y of the Intuitive reference fame, as shown in equation 9:

$$^G\hat{Z}_I = {^G\hat{X}_I} \times {^G\hat{Y}_I} \tag{9}$$

Where $^G\hat{Z}_I$ can be a unit vector that is perpendicular to $^G\hat{X}_I$ and $^G\hat{Y}_I$ described in the Ground reference frame.

Now the Intuitive reference frame can be fully defined, which can be represented by $^G\hat{X}_I$, $^G\hat{Y}_I$, and $^G\hat{Z}_I$. FIG. 4 demonstrates the Intuitive reference frame described herein, which can fulfill the requirements #1, #2, #4, and #5 from Table 1.

In order to find the Jacobian matrix relative to the Intuitive reference frame, a rotation matrix can be found that describes the Ground reference frame relative to the Intuitive reference frame, as shown in equation 10:

$$^I_G R = \begin{bmatrix} {^G\hat{X}_G} \cdot {^G\hat{X}_I} & {^G\hat{Y}_G} \cdot {^G\hat{X}_I} & {^G\hat{Z}_G} \cdot {^G\hat{X}_I} \\ {^G\hat{X}_G} \cdot {^G\hat{Y}_I} & {^G\hat{Y}_G} \cdot {^G\hat{Y}_I} & {^G\hat{Z}_G} \cdot {^G\hat{Y}_I} \\ {^G\hat{X}_G} \cdot {^G\hat{Z}_I} & {^G\hat{Y}_G} \cdot {^G\hat{Z}_I} & {^G\hat{Z}_G} \cdot {^G\hat{Z}_I} \end{bmatrix} \tag{10}$$

Where $^G\hat{X}_G=[1\ 0\ 0]$, $^G\hat{Y}_G=[0\ 1\ 0]$, $^G\hat{Z}_G=[0\ 0\ 1]$. $^I_G R$ can be the rotation matrix that describes the Ground reference frame relative to the Intuitive reference frame.

The Jacobian equation can then be found relative to the Intuitive reference frame, as shown in equation 11:

$$J_I = \begin{bmatrix} ^I_G R & 0 \\ 0 & ^I_G R \end{bmatrix} \cdot J_G \tag{11}$$

Where $J_I$ can be the Jacobian matrix relative to the Intuitive reference frame described herein.

To fulfill the requirements #3 and #6, a hybrid inverse kinematics solution can be used. This solution can account for Cartesian motions of the end-effector that can be relative to different reference frames, as shown in equation 12:

$$\dot{q} = \begin{bmatrix} \dot{\theta}_1 \\ \dot{\theta}_2 \\ \vdots \\ \dot{\theta}_n \end{bmatrix} = [J_G]^+ \cdot {^G\begin{bmatrix} 0 \\ 0 \\ UD \\ 0 \\ 0 \\ yaw \end{bmatrix}} + [J_I]^+ \cdot {^I\begin{bmatrix} FB \\ LR \\ 0 \\ roll \\ pitch \\ 0 \end{bmatrix}} \tag{12}$$

Equation 12 can fulfill all the requirements proposed in Table 1. The up/down translational motion and yaw rotational motions can be controlled in the Ground reference frame. However, the left/right, forward/backward translational motions, and pitch, roll rotation motions can be controlled in the Intuitive reference frame, as shown in FIG. 4.

FIGS. 5A-F illustrate example activity of daily living (ADL) tasks performed with the disclosed intuitive reference frame. In order to test performance of the Intuitive reference frame control system and the hybrid inverse kinematics solution described here, one or more ADL tasks can be designed and performed. A complex ADL task can include many subtasks that require interaction with cabinets, utensils, dishes and cans, as depicted in FIGS. 5A-F. Human subjects can be recruited to perform this ADL task using the three different reference control systems described herein. In order to eliminate uncertainty and possible noise from the input device, such as IMU-based solutions or camera-based methods, a 6 DoF joystick based input device (spacemouse) can be used, as shown in FIG. 1. The two side buttons can be used as open and close of a gripper of the robotic arm 200.

In order to test all 6 degrees of motion, a food seasoning task can be performed. Users can use the spacemouse to control the robotic arm 200 to grasp a bowl and add sea salt into the bowl contents. This task can be divided into the following steps (subtasks), as shown in FIGS. 5A-F. Step 1 (refer to FIG. 5A): the user can maneuver the robotic arm 200 to open the cabinet door. Step 2 (refer to FIG. 5B): grasp a bowl from inside the cabinet, then (refer to FIG. 5C) place the bowl on the desk. Step 3 (refer to FIG. 5D): grasp a can of sea salt from inside the cabinet, (refer to FIG. 5E) shake some sea salt into the bowl, then place the sea salt can back into the cabinet. Step 4 (refer to FIG. 5F): close the cabinet door.

As mentioned, 12 healthy human subjects were recruited to perform the ADL task, 10 males, 2 females. Their age range was from 24 to 42. None of the subjects had prior experience in operating robotic arms. Quantitative and qualitative data was collected from human subjects' tests. For the quantitative data, the following was recorded: time required for the subjects to perform the task. The less time required meant that the task was easier to complete using a reference frame system. Each user performed each task two times for each of the three reference frame systems. With 12 users, 3 reference frames, and 2 trials for each reference frame system, the total number of experiments performed was 72. After completing the test, users answered one qualitative question, which is: "How intuitive the reference frame system was to complete this task?". Users answered the question on a scale from 0-10, where 10 is "very intuitive", and 0 is "very difficult to use". Before each experiment, each user could learn to control the robot for 2-5 minutes in the reference frame that they were going to use for the task. The following symbols can be used to indicate the reference frame used during the experiments: G or Ground stands for the Ground reference frame control system, E or End-effector stands for the End-effector reference frame control system, H or Hybrid stands for the Intuitive reference frame system with hybrid inverse kinematics disclosed throughout. The sequence of testing the three reference frame systems was intentionally randomized, such as E H G H E G or H E G G H E, in order to eliminate possible biases introduced by user learning effect.

Figure 6:
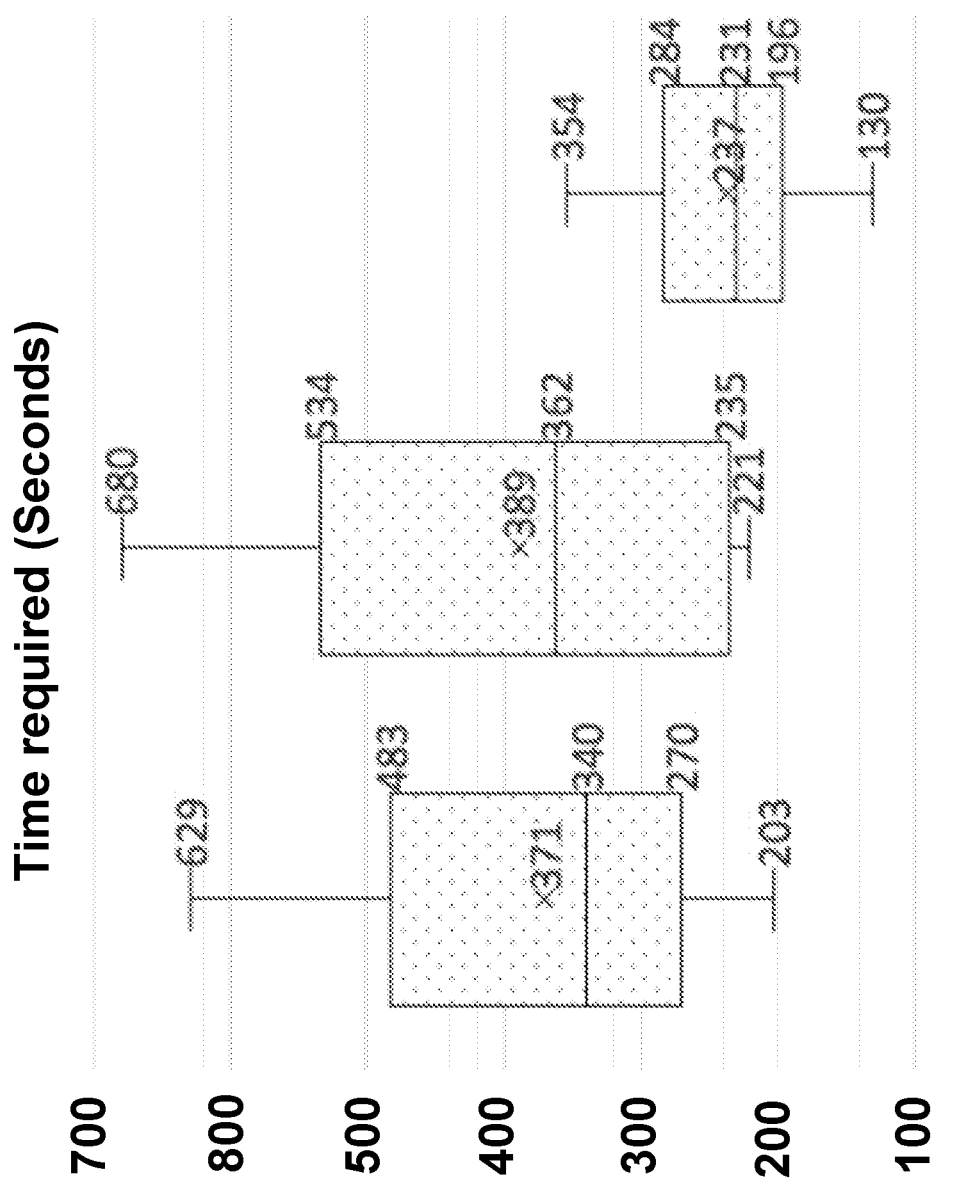
FIG. 6 is a Box & Whisker Plot depicting time required to complete ADL tasks using the three reference frames described herein.

FIG. 6 is a Box & Whisker Plot depicting time required to complete ADL tasks using the three reference frames described herein. The Plot includes average, median, lower/upper quartile, and minimum/maximum values calculated from collected data in the test described above. As shown in FIG. 6, when controlling the robot using the Ground reference frame, the average time required to complete the task was 371 seconds, the median was 340 seconds, the lower quartile was 270 seconds, the upper quartile was 483 seconds, the minimum was 203 seconds, and the maximum was 629 seconds. When controlling the robot using the End-effector reference frame, the average time required was 389 seconds, the median was 362 seconds, the lower quartile was 235 seconds, the upper quartile was 534 seconds, the minimum was 221 seconds, and the maximum was 680 seconds. When controlling the robot using the Intuitive reference frame with the hybrid inverse kinematics (hybrid system), the average time required was 237 seconds, the median was 231 seconds, the lower quartile was 196 seconds, the upper quartile was 284 seconds, the minimum was 130 seconds, and the maximum was 354 seconds.

Comparing the average time required, using the hybrid system reduced the time required to complete the task by 36% compared to the Ground, and 39% compared to the End-effector. When using H, the maximum time required was 354 seconds which was larger than the minimum time required in G (203 seconds) or in E (221 seconds). This demonstrates that each one of the 12 subjects performed the ADL task faster when using H.

Figure 7:
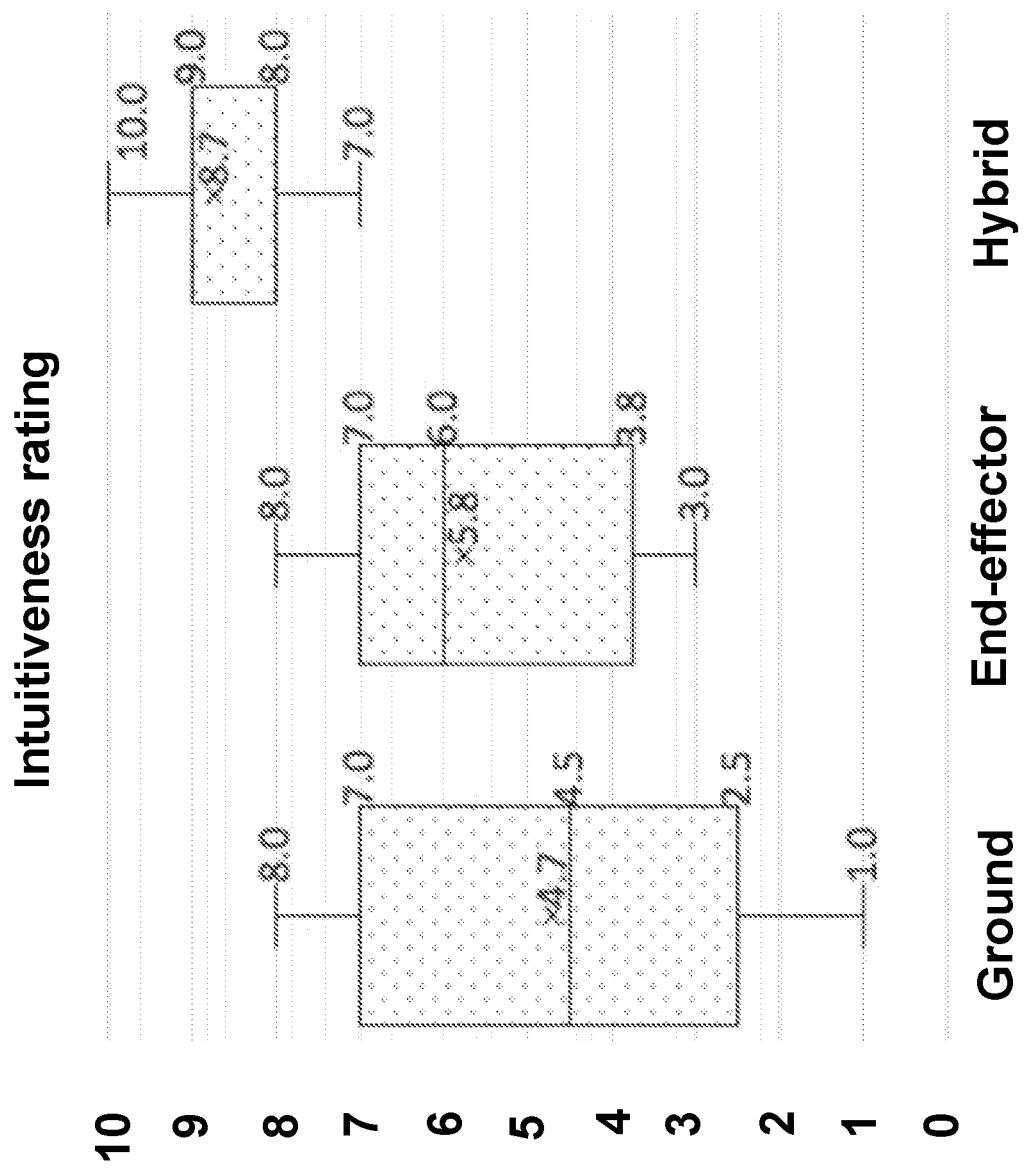
FIG. 7 is a Bow & Whisper Plot depicting intuitiveness rating of the three reference frames described herein.

FIG. 7 is a Bow & Whisper Plot depicting intuitiveness rating of the three reference frames described herein. The Plot includes average, median, lower/upper quartile, and minimum/maximum values calculated from collected data in the test described above. As shown, FIG. 7 shows the qualitative data of intuitiveness rating results from all subjects. For the Ground system, the average intuitiveness rating was 4.7, the median was 4.5, the lower quartile was 2.5, the upper quartile was 7, the lowest was 1 and the highest was 8. For the End-effector system, the average intuitiveness rating was 5.8, the median was 6, the lower quartile was 3.8, the upper quartile was 7, the lowest was 3 and the highest was 8. For the hybrid system, the average intuitiveness rating was 8.7, the median was 9, the lower quartile was 8, the upper quartile was 9, the lowest was 7 and the highest was 10.

After each subject completed the experiment, a short interview was conducted with the user, asking "how you feel about the three systems including the advantages and disadvantages of these systems and improvement suggestions". Two subjects mentioned that they preferred to control translation and rotation motions separately, using two joystick knobs. Eight subjects mentioned that controlling the robotic arm using the hybrid system was the way they wanted the robot to move. However, when using G or E, they needed to think from the robot's perspective, which made them more prone to making mistakes in maneuvering the robotic arm, thereby diverting their attention away from the task. This caused frustration over time.

Figure 8:
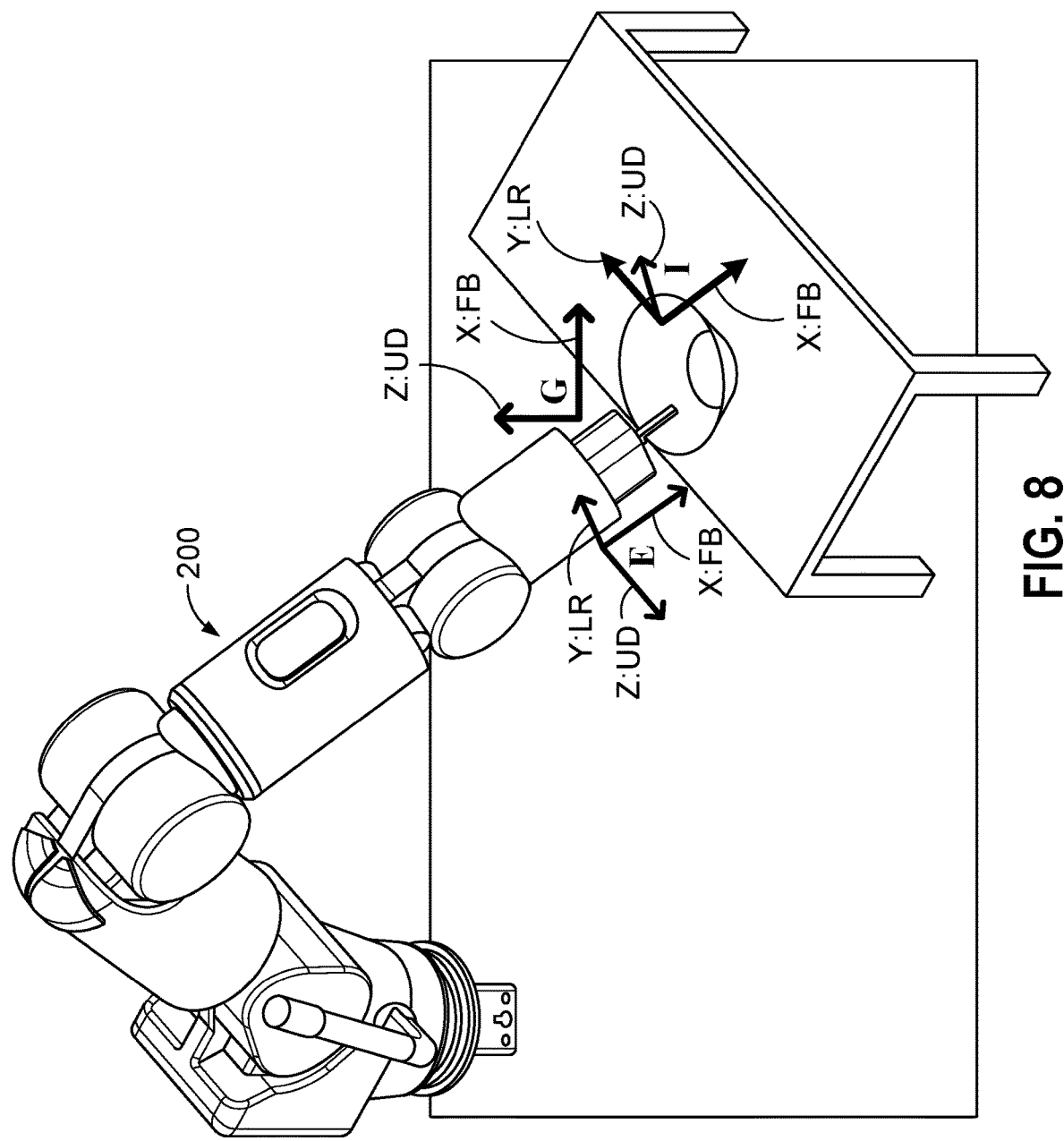
FIG. 8 depicts how Ground, End-effector, and Intuitive reference frames can be used to manipulate a robotic arm in an ADL task scenario.

FIG. 8 depicts how Ground, End-effector, and Intuitive reference frames can be used to manipulate a robotic arm in an ADL task scenario. FIG. 8 represents a scenario of manipulating a robotic arm during an ADL task. The figure shows that the user can control the robotic arm to move the grasped bowl to the left side of the table, which can be indicated by the arrow in black color. The three reference frames can be placed into the figure near the end-effector according to the current pose of the end-effector. If the user wants to move the grasped bowl to the left side of the table, when using G, the user can push the spacemouse forward and left at the same time, additionally, at the same pace which will add extra cognitive load to the user. When using E, the user can push the spacemouse downward in order to move the robotic arm to the left side of the table, which can be unintuitive for the user. As shown in frame E, the Y-axis can be facing up due to the rotation of the gripper, so when the user pushes the spacemouse left or right, the end-effector can move up and down. However, when using the Intuitive Reference Frame, the user just needs to push the spacemouse left, which is the same as where he/she wants the bowl to be moved.

As described herein, the Intuitive reference frame and hybrid inverse kinematics disclosed herein (e.g., refer to FIG. 4) can make maneuvering robotic arms in ADL tasks easier for human operators. When using the conventional Ground or End-effector reference frames, regardless of what kind of input devices adopted, the interface system as a whole can be challenging for the user to control the robot naturally and intuitively. Results of human operator preference for controlling robotic arms in ADL tasks can be used to develop the Intuitive reference frame control system with hybrid inverse kinematics solution such that the users can experience more intuitive control of robotic devices. Performance of the disclosed technology can be verified by the implementation of a complex ADL task (e.g., refer to FIGS. 5A-F). Based on both quantitative and qualitative data, control using the Intuitive reference frame with the hybrid inverse kinematics (hybrid system) can decrease time required to complete the ADL task. Users felt that the hybrid system can be more natural and easier to manipulate the robotic arm than the conventional methods. As described throughout this disclosure, the Intuitive reference frame uses an intuitive Y axis, which is perpendicular to an end-effector linkage and is parallel to a ground surface to control left and right translation and pitch rotation of the robotic arm. The hybrid inverse kinematics decouples the Jacobian matrix in the ground frame from the Jacobian matrix in the end-effector frame to achieve control using multiple reference frames.

Moreover, the disclosed technology can be applied to any velocity controlled robot teleoperation system. The disclosed technology can be applied to various different input devices, such as other joystick-based interfaces, smartphone-based interfaces, and EMG-based interfaces.

Figure 9:
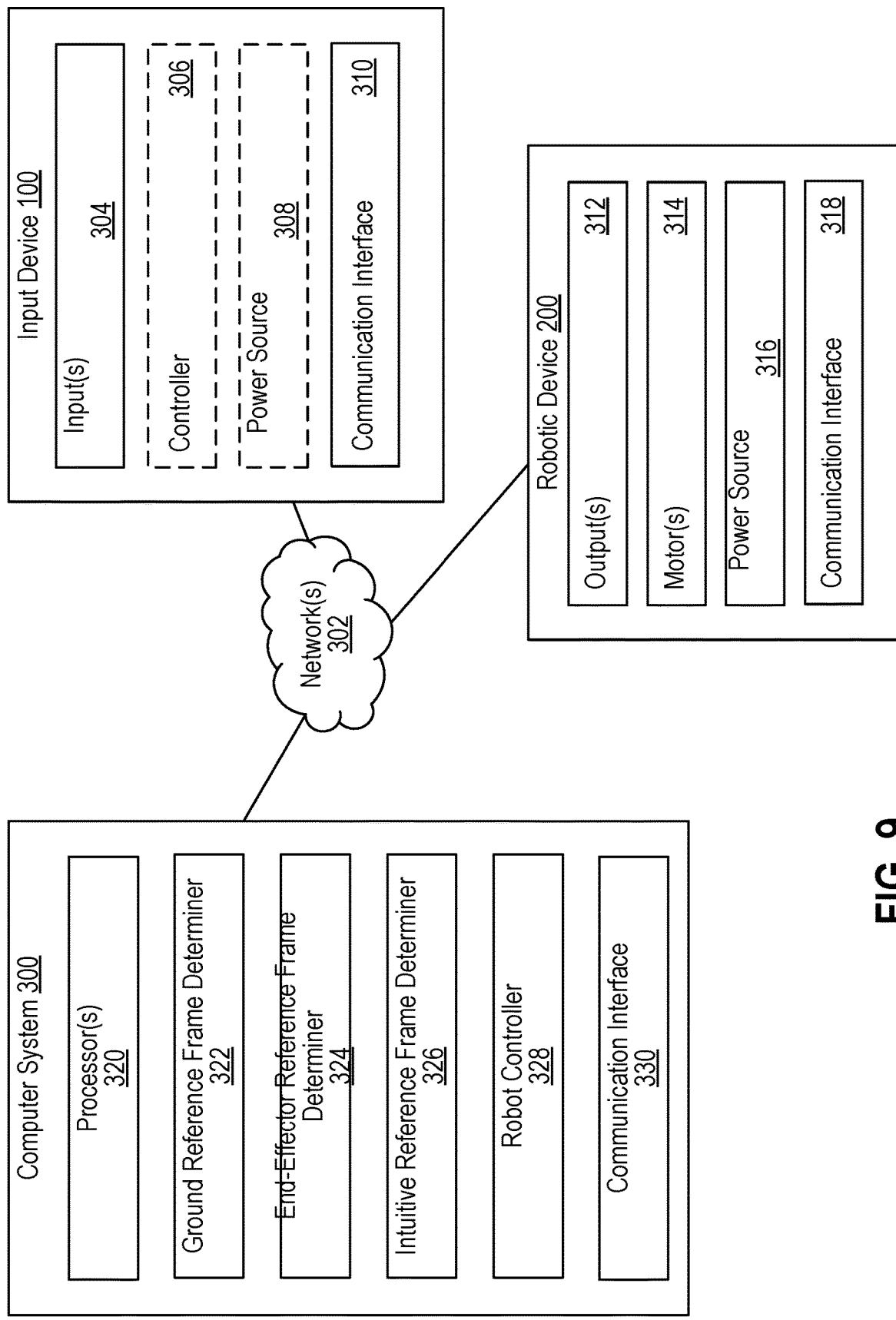
FIG. 9 is a system diagram of components used in the disclosed intuitive reference frame.

FIG. 9 is a system diagram of components used in the disclosed intuitive reference frame. The input device 100 (e.g., the spacemouse), robotic device 200 (e.g., the robotic arm), and a computer system 300 can communicate (e.g., wired and/or wireless) over network(s) 302, as described herein (e.g., refer to FIG. 1).

The input device 100 can include input(s) 304, a controller 306, a power source 308, and a communication interface 310. As described herein, the input device 100 can be a joystick, a spacemouse, a mobile phone, tablet, computer, laptop, EMG interface, or other similar type of interface. The input device 100 can be used by a human operator to teleoperate the robotic device 200.

The input(s) 304 can receive user input that indicates the user's desired movement of the robotic device 200. For example, with the spacemouse example described throughout this disclosure, the user can move the joystick (e.g., the input(s) 304) forward (e.g., away from the user) to mimic a forward motion of the robotic device 200. The user can similarly move the joystick backwards (e.g., towards the user) to mimic a backwards motion of the robotic device 200. The input received by the input(s) 304 can include 6 DoF Cartesian space user input velocity vector. The input(s) 304 can be a joystick, keyboard, mouse, or other device or component configured to receive user input with regards to moving the robotic device 200. The user input can then be transmitted to the computer system 300 for processing.

The controller 306 can optionally be configured to control movement of the robotic device 200. For example, the controller 306 can receive, from the computer system 300, instructions to move the robotic device 200 in a direction/motion that corresponds to the user input. In other implementations, once the computer system 300 determines instructions to move the robotic device 200, the computer system 300 can control movement of the robotic device 200 using those instructions.

The input device 100 can optionally include the power source 308. The power source 308 can be wired and/or wireless. In some implementations, the input device 100 can be plugged into an external power source (e.g., an outlet, external battery pack, the computer system 300, a different computer system or device). In some implementations, the input device 100 can have a power source integrated therein. The power source 100 can be a rechargeable battery, a replaceable battery, or any similar type of power supply.

The robotic device 200 can have output(s) 312, motor(s) 314, a power source 316, and a communication interface 318. As described herein, the robotic device 200 can be a robot arm having one or more hand-like grippers. The robotic device 200 can also be any other type of robot hardware that can be operated by a human user. The output(s) 312 can include an arm, gripper, or other components that can be used, by the robotic device 200, to perform different types of tasks. The motor(s) 314 can be configured to control or execute operation of the output(s) 312. For example, the controller 306 of the input device 100 or a robot controller 328 of the computer system 300 can be configured to instruct one or more of the motor(s) 314 to move the output(s) 312 as the user at the input device 100 desires and according to the movement instructions generated by the computer system 300.

The power source 316 can provide power to the robotic device 200 such that the device 200 can perform tasks as instructed. The power source 316 can be integrated into the robotic device 200. The power source 316 can also be an external power supply that is communicably coupled to the robotic device 200. In some implementations, the power source 316 can be a rechargeable battery, a replaceable battery, or any other similar type of power supply.

The computer system 300 can include processor(s) 320, ground reference frame determiner 322, end-effector reference frame determiner 324, intuitive reference frame determiner 326, robot controller 328, and a communication interface 330. The processor(s) 320 can be configured to perform one or more operations as described throughout this disclosure.

The ground reference frame determiner 322 can be configured to determine movement of the robotic device 200 based on the user input received at the input device 100 relative to the ground reference frame (e.g., refer to FIG. 2). The end-effector reference frame determiner 324 can be configured to determine movement of the robotic device 200 based on the user input relative to the end-effector reference frame (e.g., refer to FIG. 3). The intuitive reference frame determiner 326 can be configured to determine movement of the robotic device 200 based on the user input, the ground reference frame, and the end-effector reference frame using hybrid inverse kinematics as described throughout this disclosure (e.g., refer to FIG. 4).

The controller 328 can be configured to generate instructions to operate the robotic device 200 according to the user input of the user's desired movement for the robotic device 200. The instructions can be generated based on determinations made by one or more of the determiners 322, 324, and 326. The controller 328 can generate and execute instructions for moving the robotic device 200 in the intuitive reference frame. The controller 328 can also generate and execute instructions for moving the robotic device 200 in multiple of the reference frames described herein.

The communication interfaces 310, 318, and 330 can be configured to provide for communication between one or more of the system components depicted and described herein.

Figure 10:
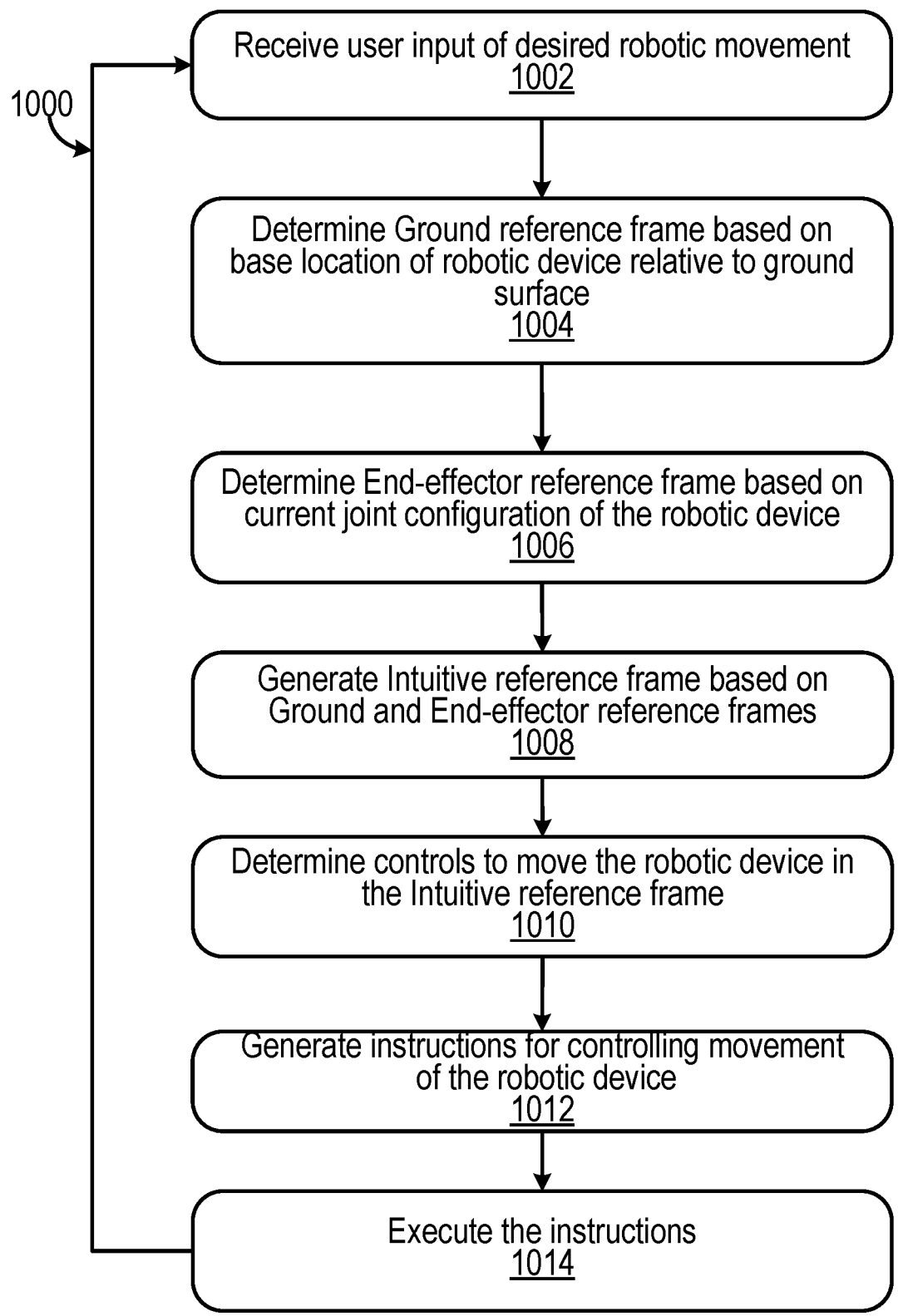
FIG. 10 is a flowchart of a process for controlling the robotic device with the disclosed intuitive reference frame.

FIG. 10 is a flowchart of a process 1000 for controlling the robotic device with the disclosed intuitive reference frame. The process 1000 can be performed by the computer system 300. One or more steps in the process 1000 can be performed by one or more other computing systems and/or devices (e.g., the input device 100).

Referring to the process 1000, user input indicating a desired movement of the robotic device can be received at the computer system in 1002. In 1004, the computer system can determine a ground reference frame based on a location of the robotic device relative to a ground surface (e.g., refer to FIG. 2). In 1006, the computer system can determine an end-effector reference frame based on a current joint configuration of the robotic device (e.g., refer to FIG. 3). For example, the computer system can determine the end-effector reference frame based on transforming the ground reference frame based on the current joint configuration of the robotic device. The end-effector reference frame can then change with the current joint configuration of the robotic device. Using the ground and end-effector reference frames, the computer system can generate an intuitive reference frame in 1008 (e.g., refer to FIG. 4). Generating the intuitive reference frame can include assigning an x axis of the intuitive reference frame to an x axis of the end-effector reference frame. Generating the intuitive reference frame can also include assigning a y axis of the intuitive reference frame based on a cross product of a z axis of the ground reference frame and the x axis of the intuitive reference frame. Moreover, generating the intuitive reference frame can include assigning a z axis of the intuitive reference frame based on a cross product of the x axis of the intuitive reference frame and the y axis of the intuitive reference frame.

Next, the computer system can determine controls to move the robotic device in the intuitive reference frame (1010). For example, if the user input indicates movement along an x axis of the end-effector reference frame, then the computer system can determine corresponding controls to move the robotic device in a forward of a backward direction (e.g., refer to TABLE 1). As another example, if the user input indicates movement along an axis perpendicular to the x axis of the end-effector reference frame and parallel to a ground surface, then the computer system can determine corresponding controls to move the robotic device in a left or a right direction. If the user input indicates movement along a z axis of the ground reference frame, then the computer system can determine corresponding controls to move the robotic device in an up or a down direction. If the user input indicates movement around the x axis of the end-effector reference frame, then the computer system can determine corresponding controls to move the robotic device in a roll direction. If the user input indicates movement around an axis perpendicular to the x axis of the end-effector reference frame and parallel to the ground surface, then the computer system can determine corresponding controls to move the robotic device in a pitch direction. If the user input indicates movement around the z axis of the ground reference frame, then the computer system can determine corresponding controls to move the robotic device in a yaw direction.

The computer system can generate instructions for controlling movement of the robotic device based on the determined controls (1012). Thus, the instructions can be generated for controlling movement of the robotic device in the intuitive reference frame. In some implementations, the instructions can also be generated for controlling movement of the robotic device in the ground reference frame or the end-effector reference frame. The computer system can execute the instructions in 1014, thereby controlling movement of the robotic device according to the user input.

The process 1000 can repeat for each user input received from the input device.

Figure 11:
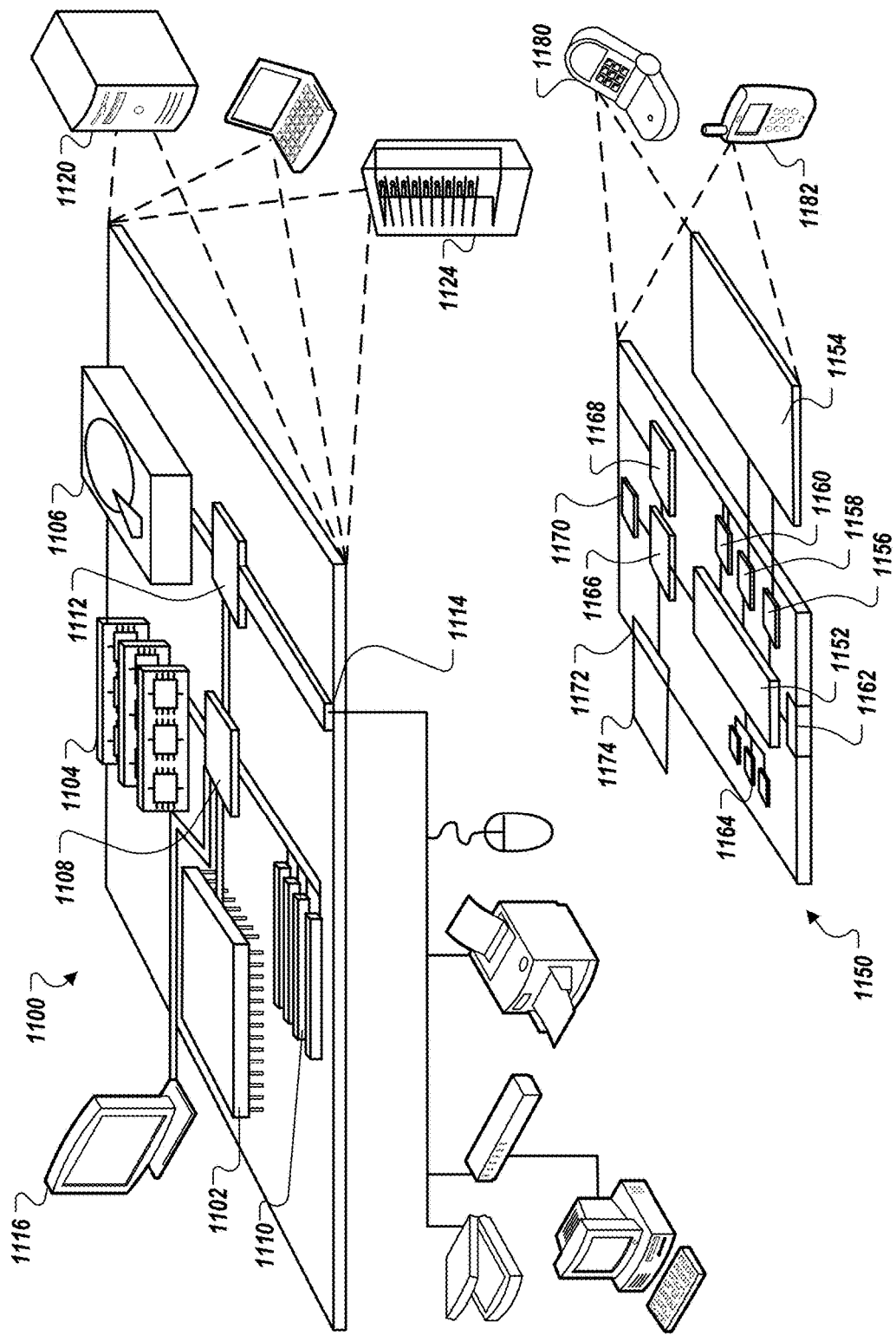
FIG. 11 is a schematic diagram that shows an example of a computing device and a mobile computing device.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer—or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180. It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for controlling a robotic device, the system comprising:
    a robotic device configured to perform one or more tasks;
    an input device configured to receive user input indicating desired movement of the robotic device to perform the one or more tasks;
    a ground reference frame determiner;
    an end-effector reference frame determiner;
    an intuitive reference frame determiner;
    a processor; and
    a controller configured to control the robotic device based on the user input indicating the desired movement of the robotic device, the controller configured to:
        receive signals identifying the user input from the input device;
        determine a ground reference frame using the ground reference frame determiner and the processor configured to track the real-time location of the ground reference frame for controlling movement of the robotic device based on user input and a base location of the robotic device relative to a ground surface;
        determine an end-effector reference frame using the end-effector reference frame determiner and the processor configured to track the real-time location of the end-effector reference frame for controlling movement of the robotic device, wherein the end-effector reference frame is based on a current joint configuration of the robotic device;
        generate, based on the ground reference frame and the end-effector reference frame, an intuitive reference frame for controlling movement of the robotic device;
        assign an axis of the intuitive reference frame to an x axis of the end-effector reference frame;
        assign a y axis of the intuitive reference frame based on a cross product of a z axis of the ground reference frame and the x axis of the intuitive reference frame;
        determine the intuitive reference frame in real-time using the intuitive reference frame determiner which determines the movement of the robotic device based on user input, ground reference frame, and end-effector reference frame using hybrid inverse kinematics;
        generate instructions to operate the robotic device according to the user input in the intuitive reference frame; and
        execute the instructions to operate the robotic device according to the user input in the intuitive reference frame.

2. The system of claim 1, wherein the controller is configured to:
    receive user input indicating movement along the x axis of the end-effector reference frame; and
    determine, based on the user input, corresponding controls to move the robotic device in a forward or a backward direction in the intuitive reference frame.

3. The system of claim 1, wherein the controller is configured to:
    receive user input indicating movement along an axis perpendicular to the x axis of the end-effector reference frame and parallel to a ground surface; and
    determine, based on the user input, corresponding controls to move the robotic device in a left or a right direction in the intuitive reference frame.

4. The system of claim 1, wherein the controller is configured to:
    receive user input indicating movement along the z axis of the ground reference frame; and
    determine, based on the user input, corresponding controls to move the robotic device in an up or a down direction in the intuitive reference frame.

5. The system of claim 1, wherein the controller is configured to:
    receive user input indicating movement around the x axis of the end-effector reference frame; and
    determine, based on the user input, corresponding controls to move the robotic device in a roll direction in the intuitive reference frame.

6. The system of claim 1, wherein the controller is configured to:
    receive user input indicating movement around an axis perpendicular to the x axis of the end-effector reference frame and parallel to a ground surface; and
    determine, based on the user input, corresponding controls to move the robotic device in a pitch direction in the intuitive reference frame.

7. The system of claim 1, wherein the controller is configured to:
    receive user input indicating movement around the z axis of the ground reference frame; and
    determine, based on the user input, corresponding controls to move the robotic device in a yaw direction in the intuitive reference frame.

8. The system of claim 1, wherein the robotic device is controlled in the end-effector reference frame or the ground reference frame.

9. The system of claim 1, wherein determining the end-effector reference frame comprises transforming the ground reference frame based on the current joint configuration of the robotic device.

10. The system of claim 1, wherein the end-effector reference frame changes with the current joint configuration of the robotic device.

11. The system of claim 1, wherein generating the intuitive reference frame comprises assigning a z axis of the intuitive reference frame based on a cross product of the x axis of the intuitive reference frame and the y axis of the intuitive reference frame.

12. A method for controlling movement of a robotic device, the method comprising:
receiving user input using a controller and an input device wherein the user input indicates the desired movement of a robotic device;
determining a ground reference frame using a ground reference frame determiner and a processor which track the real-time location of the ground reference frame based on user input and a base location of the robotic device relative to a ground surface;
determining an end-effector reference frame using an end-effector determiner and a processor which track the real-time location of the end-effector reference, wherein the end-effector reference is determined by transforming the ground reference frame based on a current joint configuration of the robotic device;
automatically generating, in real-time, an intuitive reference frame for controlling movement of the robotic device using the controller based on the ground reference frame;
automatically generating, in real-time, an x axis of the intuitive reference frame to an axis of the end-effector reference frame using the controller;
automatically generating, in real-time, a y axis of the intuitive reference frame based on a cross product of a z axis of the ground reference frame and the x axis of the intuitive reference frame using the controller;
determining, by the controller, controls to move the robotic device in the intuitive reference frame;
generating, by the controller, instructions for controlling movement of the robotic device in the intuitive reference frame, end-effector reference frame, or the ground reference frame; and
executing, by the controller, the generated instructions to control movement of the robotic device in the intuitive reference frame, end-effector reference frame, or the ground reference frame.

13. The method of claim 12, further comprising executing, by the controller, the instructions to control movement of the robotic device.

14. The method of claim 12, further comprising:
receiving, by the controller and from the input device, user input indicating movement along the x axis of the end-effector reference frame; and
determining, by the controller and based on the user input, corresponding controls to move the robotic device in a forward or a backward direction in the intuitive reference frame.

15. The method of claim 12, further comprising:
receiving, by the controller and from the input device, user input indicating movement along an axis perpendicular to the x axis of the end-effector reference frame and parallel to a ground surface; and
determining, by the controller and based on the user input, corresponding controls to move the robotic device in a left or a right direction in the intuitive reference frame.

16. The method of claim 12, further comprising:
receiving, by the controller and from the input device, user input indicating movement along the z axis of the ground reference frame; and
determining, by the controller and based on the user input, corresponding controls to move the robotic device in an up or a down direction in the intuitive reference frame.

17. The method of claim 12, further comprising:
receiving, by the controller and from the input device, user input indicating movement around the x axis of the end-effector reference frame; and
determining, by the controller and based on the user input, corresponding controls to move the robotic device in a roll direction in the intuitive reference frame.

18. The method of claim 12, further comprising:
receiving, by the controller and from the input device, user input indicating movement around an axis perpendicular to the x axis of the end-effector reference frame and parallel to a ground surface; and
determining, by the controller and based on the user input, corresponding controls to move the robotic device in a pitch direction in the intuitive reference frame.

19. A system for controlling a robotic device, the system comprising:
a robotic device configured to perform one or more tasks;
an input device configured to receive user input indicating desired movement of the robotic device to perform the one or more tasks;
a ground reference frame determiner;
a processor; and
a controller configured to control the robotic device based on the user input indicating the desired movement of the robotic device, the controller configured to:
receive signals identifying the user input from the input device;
determine a ground reference using the ground reference frame determiner and the processor configured to track the real-time location of the ground reference frame for controlling movement of the robotic device based on user input and a base location of the robotic device relative to a ground surface;
determine an end-effector reference frame using the processor to track the real-time location of the end-effector reference, wherein the end-effector reference frame is determined by transforming the ground reference frame based on a current joint configuration of the robotic device;
generate, based on the ground reference frame and the end-effector reference frame, an intuitive reference frame for controlling movement of the robotic device;
wherein the intuitive reference frame comprises assigning a z axis of the intuitive reference frame based on a cross product of ax axis of the intuitive reference frame and a y axis of the intuitive reference frame;
generate instructions for controlling the robotic device in one or more of the ground reference frame, the end-effector reference frame, and the intuitive reference frame; and
execute the generated instructions to control movement of the robotic device according to one or more of the ground reference frame, the end-effector reference frame, and the intuitive reference frame.

20. The system of claim 19, wherein generating the intuitive reference frame comprises assigning a y axis of the intuitive reference frame based on a cross product of a z axis of the ground reference frame and the x axis of the intuitive reference frame.

\* \* \* \* \*